Nov. 5, 1963    W. A. BERGLUND    3,109,448
SAFETY VALVE ASSEMBLY FOR BRAKE LINES
Filed May 19, 1961
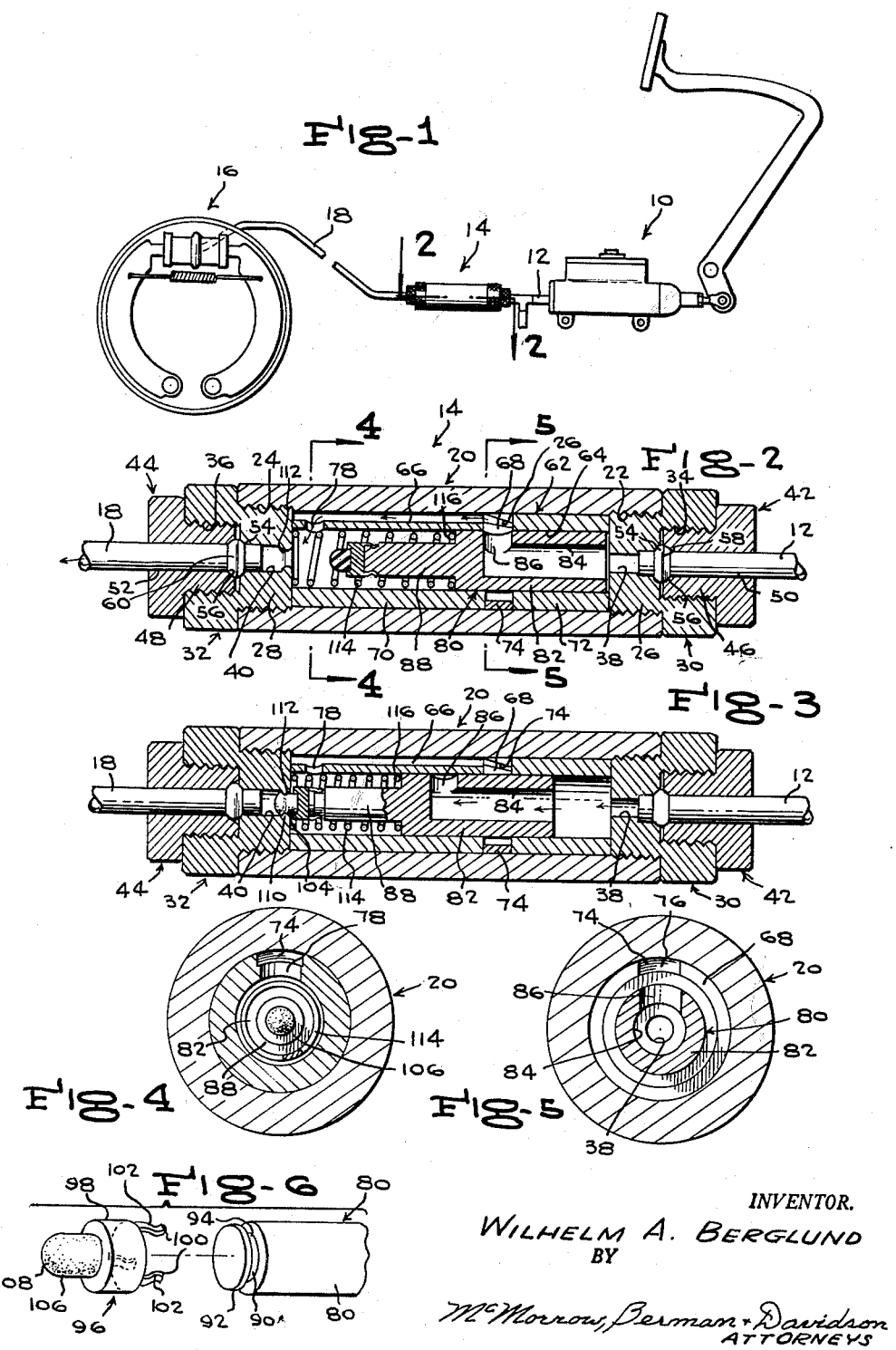
INVENTOR.
WILHELM A. BERGLUND
BY
McMorrow, Berman & Davidson
ATTORNEYS United States Patent Office
3,109,448
Patented Nov. 5, 1963

3,109,448
SAFETY VALVE ASSEMBLY FOR BRAKE LINES
Wilhelm A. Berglund, 6834 W. Ardmore Ave.,
Chicago, Ill.
Filed May 19, 1961, Ser. No. 111,200
5 Claims. (Cl. 137—460)

This invention relates to a novel safety valve assembly for connection in hydraulic brake lines for automatically isolating wheel brake cylinder assemblies from the hydraulic system whenever disabling leaks occur in the assemblies or in the flexible lines leading thereto.

The primary object of the invention is the provision of a generally improved, more efficient, and more reliable device of the kind indicated, wherein, upon the occurrence of a disabling leak in a wheel cylinder assembly, or in a line leading thereto, a deformable plug is forcibly and securably engaged in a discharge port, leading to the line or to the assembly, and can be removed from the discharge port only by partially disassembling the device and mechanically removing the plug from the port, whereby reliance upon such as springs or residual fluid pressure are eliminated, along with the liability of sucking of air into the hydraulic system through an incompletely or intermittently closed valve operated by a spring or by residual pressure.

Another object of the invention is the provision of a device of the character indicated above, wherein a movable plunger which carries the deformable plug serves as a valve for closing a by-pass port in a valve body which normally has communication with the discharge port in an arrangement wherein the plunger is moved by normal fluid pressure in the pressure line leading to the device, against the resistance of spring means, to close the by-pass port in advance of engaging the plug in the discharge port, as a leak develops in a wheel cylinder assembly or a flexible line leading thereto, whereby the valve assembly seals the pressure line against loss of fluid therefrom before the plug is engaged in the discharge port.

Still another object of the invention is the provision of a device of the character indicated above, wherein the plunger remains substantially immobile because of the resistance of the spring means, so that the valve port remains open and permits normal communication between the by-pass port and the discharge port, until such time as a drop in pressure occurs at the discharge port, and a consequent increase in pressure is produced against the plunger which operates the plunger, against the resistance of the spring means, for closing the by-pass port, so that the device can be characterized as having no moving parts unless and until a break occurs in a wheel brake cylinder assembly or in the line leading thereto.

A further object of the invention is the provision of a simple device of the character indicated above, which is composed of a small number of uncomplex and easily assembled parts, and which can be made in rugged and long-life forms, at relatively low cost.

Other important objects and advantageous features of the invention will be apparent from the following description and the accompanying drawings, wherein, for purposes of illustration only, a specific form of the invention is set forth in detail.

In the drawings:

FIGURE 1 is a contracted schematic side elevation, showing a device of the present invention installed in a hydraulic fluid brake line between a master cylinder and a wheel brake assembly;

FIGURE 2 is an enlarged longitudinal section taken through the device on the line 2—2 of FIGURE 1, and showing the plunger in normal position;

FIGURE 3 is a view like FIGURE 2, showing the plunger in operated position, with the plug assembly engaged in the discharge port;

FIGURES 4 and 5 are further enlarged transverse sections taken on the lines 4—4 and 5—5, respectively, of FIGURE 2; and, FIGURE 6 is an enlarged fragmentary exploded perspective view of the plunger and its deformable sealing plug.

Referring in detail to the drawings, wherein like numerals designate like parts throughout the several views, there are therein shown a pedal-operated hydraulic brake system master cylinder 10, from which leads a relatively rigid pressure line 12, on which is connected a safety valve assembly 14 of the present invention, the assembly 14 being connected to a brake cylinder assembly 16, as by a flexible discharge line 18.

The illustrated safety valve assembly or device 14 comprises an elongated body composed of a hollow cylinder 20, having internal screw threads 22 and 24 at its intake and discharge or rear and forward ends thereof, respectively, in which are threaded the shanks 26 and 28 of intake and discharge heads 30 and 32, respectively. The heads 30 and 32 have threaded recesses 34 and 36, respectively, in their outer ends, which communicate with reduced diameter axial bores 38 and 40, respectively, extending through their shanks. Coupling nuts 42 and 44 have studs 46 and 48 threaded into the recesses 34 and 36, respectively, and axial bores 50 and 52 extend through the nuts and communicate with the head bores 38 and 40, respectively. The meeting ends of the head and nut bores are formed with facing flares 54 and 56, for accommodating enlarged diameter sleeves 58 and 60, on the end of the pressure line 12, leading from the master cylinder 10, and on the end of the discharge line 18, respectively, the ends of these lines being inserted through related bores of the heads and the nuts.

The inner ends of the shanks 26 and 28 of the heads 30 and 32 bear against the rear and forward ends, respectively, of a stationary tubular sleeve 62 having a smooth uniform diameter axial bore 64 extending therethrough. The sleeve 62 is formed with an external longitudinal by-pass groove 66, which leads from a radial by-pass port 68, at a point intermediate the ends of the sleeve, to the forward end of the sleeve adjacent to the discharge head 32.

The by-pass port 68 is annular and is defined by having the sleeve 62 in two sections, a forward section 70 incorporating the by-pass groove 66, and an unindented section 72. The sections are separated by a spacer ring 74 located therebetween. The inner surface of the spacer ring is chamfered, as indicated at 76, in line with the by-pass groove 66, to provide for free flow of fluid to the groove 66. The sidewall of the sleeve section 70 is provided with a port 78 which opens to the by-pass groove 66 and the bore 64 of the sleeve 62, at a location near to the inner end of the discharge head 32.

A plunger, generally designated 80, slides in the sleeve bore 64, and comprises a tubular rear portion 82 having a blind axial bore 84 opening to the bore 38 of the intake head 30 and larger in diameter than the bore 38, which normally abuts the inner end of the shank 26 of the head 30, as shown in FIGURE 2, whereby a port 86 in the sidewall of the plunger portion 82 is registered with the by-pass port 68, and communicates with the by-pass groove 66. The plunger 80 further comprises a reduced diameter, preferably solid, axial forward portion 88, which extends toward and is shorter than the distance between the rear plunger portion 82 and the inner end of the shank 28 of the discharge head 32, in the normal position of the plunger illustrated in FIGURE 2.

The forward end of the plunger portion 88 is provided with a reduced diameter axial extension 90 having an enlarged diameter annular flange 92, around its outer end, which, with the adjacent end of the portion 88, defines an annular retaining groove 94, for a deformable plug assembly 96.

The plug assembly 96 comprises a cylindrical block 98 having circumferentially spaced spring fingers 100 extending from one end thereof, which, as shown in FIGURE 6, have radially inwardly indented portions 102 adapted to snap into the retaining groove 94, for mounting the block 98 axially against the outer end of the extension 90. The outer end of the block 98 is formed with a circular chamfered recess 104, which retainably receives, under compression, the inner end of an axially elongated deformable plug 106, having a rounded forward end 108.

The bore 40 in the shank 28 of the discharge head 32, instead of being of uniform diameter, like the bore 38 of the intake head, is reduced, adjacent its inner end so as to provide an annular restriction 110, and flared, at its inner end, as indicated at 112. The flare 112 is large enough to provide for initial entrance of the rounded end 108 of the plug. A coil spring 114 is circumposed on the plunger portion 88, and is compressed between the inner end of the shank of the discharge head and the shoulder 116 defined at the meeting of the plunger, portions 82 and 88, and serves to resist displacement of the plunger 80 from its normal position shown in FIGURE 2. When, under conditions hereinafter explained, the plunger 80 is moved toward the discharge head 32, the plug 106 is forced into the bore 40 of the discharge head 32, and, in so doing is compressed and deformed by the restriction 110, at a point intermediate its ends, as shown in FIGURE 3, whereby the plug 106 securely seals the bore 40. Retraction of the plunger 80 by the spring 114, under conditions hereinafter explained, causes the fingers 100 to disengage from the retaining groove 94 on the plunger portion 88, and leave the plug 106 in place in the bore 40, where the plug remains until the discharge head 32 is removed and the plug is extracted from the bore 40.

In operation, the plunger 80 remains immobile in its normal position, as shown in FIGURE 2, until the occurrence of a disabling leak in the discharge line 18 or in the wheel cylinder assembly 16, produces a reduction or absence of the back pressure of fluid, which exists while the line 18 and assembly 16 are intact, against the plunger 80, and which with the tension of the spring 114, normally assures a normal position of the plunger. When such a reduction of back pressure takes place, accompanied by forward pressure of fluid entering through the rear or intake head 30, the plunger 80 is forced forwardly against the resistance of the spring 114, so that, in its initial forward movement, the rear section 82 of the plunger closes the by-pass port 68, so that the plunger port 86 and the by-pass port 68 are unregistered and the by-pass port 68 is closed. This prevents loss of fluid from the brake system by closing off the by-pass groove 66, through which the incoming fluid would otherwise and ordinarily does pass to the sleeve port 78, to the bore 40 of the discharge head 32, and to the discharge line 18. As the pressure of incoming fluid builds up behind the plunger 80, as upon application of the brake pedal of the system, the plunger is moved further forwardly until the plug 106 enters and is jammed into the discharge head bore 40, as hereinabove explained. With the plug 106 jammed in the bore 40, relaxation of the brake pedal and hence a reduction of pressure in the fluid behind the plunger 80, frees the plunger 80 to be restored, by the spring 114, to its normal position, without withdrawing the plug 106 from the bore 40. Subsequent repeated operations of the brake pedal cause the plunger to move forwardly, as before, so that the forward end of the forward plunger portion 88 reengages the plug 106 and either forces the same further into the discharge head bore 40, are merely compresses the plug.

Although there has been shown and described herein a preferred form of the invention, it is to be understand that the invention is not necessarily confined thereto, and that any change or changes in the structure of and in the relative arrangements of components thereof are contemplated as being within the scope of the invention as defined by the claims appended hereto.

What is claimed is:

1. A brake line safety valve assembly comprising a hollow cylinder having forward and rear ends, discharge and inlet heads severally closing said ends, said heads having axial bores extending therethrough and opening to the interior of the cylinder and adapted to receive pressure lines and discharge lines, respectively, a sleeve fitting in and extending along the interior of the cylinder, said sleeve having forward and rear ends severally engaged with said heads, a by-pass port in the sidewall of said sleeve spaced from the ends of the sleeve, an external longitudinal by-pass groove in said sleeve extending forward from said by-pass port, another port in the sleeve at the forward end of the sleeve into which said by-pass groove opens, a plunger sliding in the bore of the sleeve, said plunger being shorter than the sleeve, said plunger having a full diameter rear portion which is longer than the distance between the intake head and said by-pass port, said rear portion having an axial blind bore open at its rear end to the bore of the sleeve, said rear portion having a radial port adapted to register with said by-pass port in the normal retracted position of the plunger wherein the rear end of said rear end portion engages the intake head, spring means compressed between the discharge head and the forward end of said rear plunger portion and urging the plunger to normal position, said plunger comprising a forward portion having a forward end which is spaced from the discharge head and said other port in the normal position of the plunger, and a deformable plug releasably mounted on and extending forwardly from the forward end of said forward portion by yieldable fingers, said plug being adapted to be jammed in the bore of the discharge head when the plunger is moved sufficiently forwardly in the sleeve by fluid under pressure entering the counterbore of the plunger from the bore of the intake head at a time when the intake fluid pressure exceeds the back pressure in the bore of the discharge head and the bore of the sleeve in front of the plunger by a predetermined amount sufficient to overcome the force of the spring urging the plunger to its normal position, the strength of the fingers being such that the plug will separate from the plunger and remain jammed in the discharge head bore on a subsequent retraction of the plunger to its normal position.

2. A brake line safety valve assembly comprising a hollow cylinder having forward and rear ends, discharge and inlet heads severally closing said ends, said heads having axial bores extending therethrough and opening to the interior of the cylinder and adapted to receive pressure lines and discharge lines, respectively, a sleeve fitting in and extending along the interior of the cylinder, said sleeve having forward and rear ends severally engaged with said heads, a by-pass port in the sidewall of said sleeve spaced from the ends of the sleeve, an external longitudinal by-pass groove in said sleeve extending forward from said by-pass port, another port in the sleeve at the forward end of the sleeve into which said by-pass groove opens, a plunger sliding in the bore of the sleeve, said plunger being shorter than the sleeve, said plunger having a full diameter rear portion which is longer than the distance between the intake head and said by-pass port, said rear portion having an axial blind bore open at its rear end to the bore of the sleeve, said rear portion having a radial port adapted to register with said by-pass port in the normal retracted position of the plunger wherein the rear end of said rear end portion engages the intake head, spring means compressed between the discharge head and the forward end of said rear plunger portion and urging the plunger to normal position, said plunger comprising a forward portion having a forward end which is spaced from the discharge head and said other port in the normal position of the plunger, and a deformable plug releasably mounted on and extending forwardly from the forward end of said forward portion by yieldable fingers, said plug being adapted to be jammed in the bore of the discharge head when the plunger is moved sufficiently forwardly in the sleeve by fluid under pressure entering the counterbore of the plunger from the bore of the intake head at a time when the intake fluid pressure exceeds the back pressure in the bore of the discharge head and the bore of the sleeve in front of the plunger by a predetermined amount sufficient to overcome the force of the spring urging the plunger to its normal position, the strength of the fingers being such that the plug will separate from the plunger and remain jammed in the discharge head bore on a subsequent retraction of the plunger to its normal position, said sleeve comprising spaced forward and rear sections, said by-pass port being annular and defined between the facing ends of the sleeve sections, and an annular spacer engaged between the sections.

3. A brake line safety valve assembly comprising a hollow cylinder having forward and rear ends, discharge and inlet heads severally closing said ends, said heads having axial bores extending therethrough and opening to the interior of the cylinder and adapted to receive pressure lines and discharge lines, respectively, a sleeve fitting in and extending along the interior of the cylinder, said sleeve having forward and rear ends severally engaged with said heads, a by-pass port in the sidewall of said sleeve spaced from the ends of the sleeve, an external longitudinal by-pass groove in said sleeve extending forward from said by-pass port, another port in the sleeve at the forward end of the sleeve into which said by-pass groove opens, a plunger sliding in the bore of the sleeve, said plunger being shorter than the sleeve, said plunger having a full diameter rear portion which is longer than the distance between the intake head and said by-pass port, said rear portion having an axial blind bore open at its rear end to the bore of the sleeve, said rear portion having a radial port adapted to register with said by-pass port in the normal retracted position of the plunger wherein the rear end of said rear end portion engages the intake head, spring means compressed between the discharge head and the forward end of said rear plunger portion and urging the plunger to normal position, said plunger comprising a forward portion having a forward end which is spaced from the discharge end and said other port in the normal position of the plunger, and a deformable plug releasably mounted on and extending forwardly from the forward end of said forward portion by yieldable fingers, said plug being adapted to be jammed in the bore of the discharge head when the plunger is moved sufficiently forwardly in the sleeve by fluid under pressure entering the counterbore of the plunger from the bore of the intake head at a time when the intake fluid pressure exceeds the back pressure in the bore of the discharge head and the bore of the sleeve in front of the plunger by a predetermined amount sufficient to overcome the force of the spring urging the plunger to its normal position, the strength of the fingers being such that the plug will separate from the plunger and remain jammed in the discharge head bore on a subsequent retraction of the plunger to its normal position, said forward portion of the plunger being smaller in diameter than the rear plunger portion of the bore of the sleeve, the meeting of the plunger sections defining a shoulder, said spring means comprising a coil spring circumposed on said forward portion and compressed between said shoulder and the discharge head.

4. A brake line safety valve assembly comprising a hollow cylinder having forward and rear ends, discharge and inlet heads severally closing said ends, said heads having axial bores extending therethrough and opening to the interior of the cylinder and adapted to receive pressure lines and discharge lines, respectively, a sleeve fitting in and extending along the interior of the cylinder, said sleeve having forward and rear ends severally engaged with said heads, a by-pass port in the sidewall of said sleeve spaced from the ends of the sleeve, an external longitudinal by-pass groove in said sleeve extending forward from said by-pass port, another port in the sleeve at the forward end of the sleeve into which said by-pass groove opens, a plunger sliding in the bore of the sleeve, said plunger being shorter than the sleeve, said plunger having a full diameter rear portion which is longer than the distance between the intake head and said by-pass port, said rear portion having an axial blind bore open at its rear end to the bore of the sleeve, said rear portion having a radial port adapted to register with said by-pass port in the normal retracted position of the plunger wherein the rear end of said rear end portion engages the intake head, spring means compressed between the discharge head and the forward end of said rear plunger portion and urging the plunger to normal position, said plunger comprising a forward portion having a forward end which is spaced from the discharge head and said other port in the normal position of the plunger, and a deformable plug releasably mounted on and extending forwardly from the forward end of said forward portion by yieldable fingers, said plug being adapted to be jammed in the bore of the discharge head when the plunger is moved sufficiently forwardly in the sleeve by fluid under pressure entering the counterbore of the plunger from the bore of the intake head at a time when the intake fluid pressure exceeds the back pressure in the bore of the discharge head and the bore of the sleeve in front of the plunger by a predetermined amount sufficient to overcome the force of the spring urging the plunger to its normal position, the strength of the fingers being such that the plug will separate from the plunger and remain jammed in the discharge head bore on a subsequent retraction of the plunger to its normal position, said forward portion of the plunger being smaller in diameter than the rear plunger portion and the bore of the sleeve, the meeting of the plunger sections defining a shoulder, said spring means comprising a coil spring circumposed on said forward portion and compressed between said shoulder and the discharge head, said forward plunger portion having an annular retaining groove therearound at its forward end, said plug comprising a block having forward and rear ends, circumferentially spaced spring fingers projecting rearwardly beyond the rear end of said block and releasably engaged in said retaining groove, and a deformable plug element secured to and extending forwardly from the forward end of the block in line with the discharge head bore.

5. A brake line safety valve assembly comprising a hollow cylinder having forward and rear ends, discharge and inlet heads severally closing said ends, said heads having axial bores extending therethrough and opening to the interior of the cylinder and adapted to receive pressure lines and discharge lines, respectively, a sleeve fitting in and extending along the interior of the cylinder, said sleeve having forward and rear ends severally engaged with said heads, a by-pass port in the sidewall of said sleeve spaced from the ends of the sleeve, an external longitudinal by-pass groove in said sleeve extending forward from said by-pass port, another port in the sleeve at the forward end of the sleeve into which said by-pass groove opens, a plunger sliding in the bore of the sleeve, said plunger being shorter than the sleeve, said plunger having a full diameter rear portion which is longer than the distance between the intake head and said by-pass port, said rear portion having an axial blind bore open at its rear end to the bore of the sleeve, said rear portion having a radial port adapted to register with said by-pass port in the normal retracted position of the plunger wherein the rear end of said rear end portion engages the intake head, spring means compressed between the discharge head and the forward end of said rear plunger portion and urging the plunger to normal position, said plunger comprising a forward portion having a forward end which is spaced from the discharge head and said other port in the normal position of the plunger, and a deformable plug releasably mounted on and extending forwardly from the forward end of said forward portion by yieldable fingers, said plug being adapted to be jammed in the bore of the discharge head when the plunger is moved sufficiently forwardly in the sleeve by fluid under pressure entering the counterbore of the plunger from the bore of the intake head at a time when the intake fluid pressure exceeds the back pressure in the bore of the discharge head and the bore of the sleeve in front of the plunger by a predetermined amount sufficient to overcome the force of the spring urging the plunger to its normal position, the strength of the fingers being such that the plug will separate from the plunger and remain jammed in the discharge head bore on a subsequent retraction of the plunger to its normal position, said forward portion of the plunger being smaller in diameter than the rear plunger portion and the bore of the sleeve, the meeting of the plunger sections defining a shoulder, said spring means comprising a coil spring circumposed on said forward portion and compressed between said shoulder and the discharge head, said forward plunger portion having an annular retaining groove therearound at its forward end, said plug comprising a block having forward and rear ends, circumferentially spaced spring fingers projecting rearwardly beyond the rear end of said block and releasably engaged in said retaining groove, and a deformable plug element secured to and extending forwardly from the forward end of the block in line with the discharge head bore, said discharge head bore being of substantially the same diameter as the plug element and having a restriction near its rear end adapted to retainably deform the plug element as it enters the discharge head bore.

References Cited in the file of this patent
UNITED STATES PATENTS

| | | |
|---|---|---|
| 2,024,042 | Jance | Dec. 10, 1935 |
| 2,332,301 | Cox | Oct. 19, 1943 |
| 2,717,757 | Bowlzer | Sept. 13, 1955 |